US005700552A

United States Patent [19]

Katsuro et al.

[11] Patent Number: 5,700,552

[45] Date of Patent: Dec. 23, 1997

[54] PRESSURE-SENSITIVE CORRECTION TAPE

[75] Inventors: Noboru Katsuro; Toshiro Suemoto; Yoshihiro Mizutani; Masami Shini, all of Osaka, Japan

[73] Assignee: Fujicopian Co., Ltd., Japan

[21] Appl. No.: 628,290

[22] Filed: Apr. 5, 1996

[30] Foreign Application Priority Data

Apr. 7, 1995 [JP] Japan .................................... 7-082585

[51] Int. Cl.$^{6}$ ........................................ C09J 7/02

[52] U.S. Cl. ........................... 428/214; 428/215; 428/354

[58] Field of Search .................................... 428/354, 214, 428/215

[56] References Cited

U.S. PATENT DOCUMENTS 3,847,725 11/1974 Hochner .................................. 161/167

4,883,379 11/1989 Fukuda .................................. 400/697.1

5,135,798 8/1992 Muschter .................................. 428/202

*Primary Examiner*—Jenna Davis

*Attorney, Agent, or Firm*—Fish & Neave

[57] ABSTRACT

A pressure-sensitive correction tape is provided which includes: a foundation tape; and a pressure-sensitive transfer layer for masking-correction formed on one side of the foundation tape, wherein the pressure-sensitive transfer layer comprises a masking layer containing a pigment and a vehicle and a pressure-sensitive adhesive layer formed on a surface of the masking layer; wherein the pressure-sensitive adhesive layer has a thickness of 0.8 μm to 1.6 μm; and wherein a thickness ratio between the pressure-sensitive adhesive layer and the masking layer is 1:14 to 1:35.

3 Claims, No Drawings

PRESSURE-SENSITIVE CORRECTION TAPE

BACKGROUND OF THE INVENTION

The present invention relates to a pressure-sensitive correction tape for masking erroneous letters or the like recorded on a paper sheet or the like for correction.

Heretofore, there has been known a pressure-sensitive correction tape of this type, which essentially includes a pressure-sensitive transfer layer for masking-correction formed on a foundation tape and has a masking layer containing a pigment such as a white pigment and a vehicle and a pressure-sensitive adhesive layer formed on a surface of the masking layer (see Japanese Unexamined Patent Publication No. 2-14185 (1990) and No. 5-8594 (1993)).

A hand-operative transfer device for use with such a pressure-sensitive correction tape has been developed. The transfer device essentially includes a case (holder), a supply reel for supplying a pressre-sensitive correction tape, a take-up reel for taking up the tape, and a press member for pressing the tape.

When the holder is moved with the pressure-sensitive correction tape being pressed against a surface to be masked for correction by the press member, the tape is fed from the supply reel and sequentially pressed against the surface by the press member, whereby the pressure-sensitive transfer layer thereof is transferred and bonded onto the surface with the pressure-sensitive adhesive layer. The foundation tape is separated from the transfer layer after it passes the press member, and is then taken up by the take-up reel. When the press member is pressed hard against the surface and the holder is lifted upon completion of the transfer of the transfer layer, the transfer layer is cut off. Thus, the masking-correction is completed. On the masking layer of the transfer layer transferred onto the surface, letters and the like can be written with a ball-point pen or a like writing instrument.

The pressure-sensitive correction tape is wound around the supply reel into a roll form (or in a pancake form). A cassette-type correction tape including such a rolled pressure-sensitive correction tape is also provided for easy installation in the transfer device.

However, a presently commercially available pressure-sensitive correction tape, when stored in a rolled state at a high temperature and humidity, is liable to cause a blocking phenomenon. More specifically, when the front and back sides of the correction tape are brought into contact with each other, an adhesive component in the pressure-sensitive adhesive layer migrates to the back side of the foundation tape and, therefore, the surface of the adhesive layer bonds to the back side of the foundation tape. This makes it difficult to feed the correction tape, and causes a feeding failure when the correction tape is used with the transfer device.

The size of a rolled pressure-sensitive correction tape to be installed in a transfer device is determined by the size of the transfer device. Therefore, to increase the length of the correction tape to be accommodated in the transfer device (hereinafter referred to as "roll length"), the correction tape should be wound tight. This causes the blocking even at an ordinary temperature.

In view of the foregoing, it is an object of the present invention to provide a pressure-sensitive correction tape which is free from blocking when used in a rolled state, thereby facilitating masking correction with a transfer device.

The foregoing and other objects of the present invention will be apparent from the following detailed description.

SUMMARY OF THE INVENTION

In accordance with a first feature of the present invention, there is provided a pressure-sensitive correction tape which includes: a foundation tape; and a pressure-sensitive transfer layer for masking-correction formed on one side of the foundation tape. The pressure-sensitive transfer layer comprises a masking layer containing a pigment and a vehicle and a pressure-sensitive adhesive layer formed on a surface of the masking layer; wherein the pressure-sensitive adhesive layer has a thickness of 0.8 μm to 1.6 μm; and wherein a thickness ratio between the pressure-sensitive adhesive layer and the masking layer is 1:14 to 1:35.

In accordance with a second feature of the present invention, the pressure-sensitive correction tape with the first feature is characterized in that the pressure-sensitive adhesive layer has an adhesive strength of 16 to 44 gf/5 mm to a polyethylene terephthalate film.

The adhesive strength of the pressure-sensitive adhesive layer to the polyethylene terephthalate film is determined in compliance with the method of measuring an adhesive strength (180° peel test) specified in JIS Z 0237-1980 (Testing methods of pressure sensitive adhesive tapes and sheets). It should be noted that the following points are different from those specified in the adhesive strength test.

(1) Test plate

A 25 μm-thick polyethylene terephthalate film bonded on an SUS 304 steel plate is used as a test plate.

(2) Test specimen

A test specimen is prepared by forming a pressure-sensitive adhesive layer having a predetermined thickness on a 38 μm-thick, 5 mm-wide polyethylene terephthalate film. The adhesive strength of the pressure-sensitive adhesive layer is determined as a value for 5 mm width.

The thicknesses of the pressure-sensitive adhesive layer and the masking layer are determined in the following manner. A specimen is prepared by slitting the pressure-sensitive correction tape by means of a microtome (ULTRA CUT available from Reichert-Nissei Inc.), then a photograph of a section of the specimen is taken at a magnification of ×2,000 by means of a scanning electron microscope (S-800 available from Hitachi Ltd.). Measurements of the thickness of each of the layers obtained at 20 different points located at intervals of 6 μm are then averaged.

As a result of an intensive study to investigate cause of the blocking of the conventional pressure-sensitive correction tape, the present inventors have found that the blocking occurs because the pressure-sensitive adhesive layer of the conventional correction tape has a relatively great thickness of 2 μm to 3 μm. A further study focused on this point has revealed that the blocking can be prevented without any compromise of transferability of the pressure-sensitive transfer layer or the like by reducing the thickness of the pressure-sensitive adhesive layer to 0.8 μm to 1.6 μm, particularly, 1.0 μm to 1.4 μm. Thus, the present invention has been attained.

The rolled pressure-sensitive correction tape having a pressure-sensitive adhesive layer with a thickness of 0.8 μm to 1.6 μm, particularly, 1.0 μm to 1.4 μm, does not suffer from blocking even if the correction tape is stored at a high temperature and humidity. In addition, even if the pressure-sensitive correction tape is wound tight to increase the roll length thereof, blocking does not occur.

Where the thickness of the pressure-sensitive adhesive layer ranges between 0.8 μm and 1.6 μm, preferably between 1.0 μm and 1.4 μm, an adhesive used in an adhesive tape of this type has an adhesive strength within a range between 16 and 44 gf/5 mm, particularly, between 20 and 40 gf/5 mm, to a polyethylene terephthalate film. With the adhesive strength in this range, the pressure-sensitive transfer layer in a pressed portion can be assuredly transferred onto a surface to be masked without a partial transfer failure or a similar inconvenience. Thus, an excellent transferability of the transfer layer is ensured.

When the pressure-sensitive correction tape of the present invention is used with the transfer device, the correction tape is smoothly fed, and the transfer layer thereof firmly adheres to a desired portion of a surface to be masked for correction. Thus, the masking-correction is facilitated.

Since the thickness of the pressure-sensitive adhesive layer is reduced, the roll length of the pressure-sensitive correction tape can be increased.

Further, by adjusting the thickness ratio between the pressure-sensitive adhesive layer and the masking layer within a range between 1:14 and 1:35, particularly, between 1:16 and 1:24, the transferability, masking ability and overwrite characteristic of the pressure-sensitive correction tape can be improved, and the roll length thereof can be further increased. If the thickness ratio of the masking layer is less than the aforesaid range, the masking ability and overwrite characteristic may be degraded. On the other hand, if the thickness ratio of the masking layer is greater than the aforesaid range, the transferability of the correction tape may be degraded and the roll length is reduced.

DETAILED DESCRIPTION

The pressure-sensitive correction tape of the present invention includes a foundation tape, a pressure-sensitive transfer layer formed on one side of the foundation tape. The pressure-sensitive transfer layer comprises a masking layer and a pressure-sensitive adhesive layer formed thereon.

Useful as the foundation tape are plastic films such as of polyethylene terephthalate (PET), polyethylene and polypropylene, and paper sheets. The foundation tape preferably has a thickness of about 10 μm to about 50 μm. As required, a releasing agent is applied on one or both sides of the foundation tape to reduce the adhesion of the adhesive layer to the back side of the foundation tape during the storage of the pressure-sensitive correction tape or to facilitate the release of the masking layer from the foundation tape. It should be noted that blocking cannot be prevented only by applying the releasing agent on the back side of the foundation tape. Examples of releasing agents include silicone resins and fluorine-containing resins. Also useful as the foundation tape are commercially available foundations applied with a releasing agent. Examples thereof include a paper foundation available from Honshu Paper Co., Ltd. under the trade name of 40 GW and a plastic foundation (PET film) available from Honshu Paper Co., Ltd. under the trade name of 50RLW-01.

The masking layer is composed of a pigment, a vehicle, and a filler optionally added thereto.

A pressure-sensitive correction tape of this type should satisfy the following requirements: an excellent transferability (when a portion of the transfer layer is pressed, only the pressed portion should be readily cut off from the other portion and completely transferred onto a surface to be masked); a high crack resistance (when the transfer layer is transferred to a desired portion of a surface to be masked, the transferred layer should be free from cracking); and an excellent overwrite characteristic (when letters or the like are written on the transferred layer with a writing instrument such as a pencil or a ball-point pen, no raised portion should be produced on the transferred layer by a writing pressure).

The masking layer in the present invention preferably has a composition which ensures an excellent transferability, crack resistance and overwrite characteristic.

The vehicle to be used for the masking layer preferably has an elongation percentage of not less than $3.5\times10^2$% (which is measured at an ordinary temperature in compliance with ASTM D-412 test method). If the elongation percentage is less than $3.5\times10^2$%, the crack resistance is reduced, and a partial transfer failure tends to occur. The upper limit of the elongation percentage of the vehicle is typically $5.2\times10^2$%.

The vehicle comprises one or more rubbers, and/or, one or more rubber-like resins which are used either alone or as a mixture to satisfy the aforesaid requirement for the elongation percentage.

A rubber or rubber-like resin and a glassy resin, more specifically, a rubber or rubber-like resin having an elongation percentage of not lower than $4.5\times10^2$% and a glassy resin having an elongation percentage of not higher than 50% are preferably used in combination for the vehicle.

Preferable as the rubber or rubber-like resin are those having flexibility or softness. Examples of specific rubbers or rubber-like resins include ordinary synthetic rubbers and rubber-like resins such as styrene-butadiene-styrene block copolymer (SDS), styrene-ethylene-butylene-styrene block copolymer (SEBS), styrene-butadiene rubber, styrene-isoprene-styrene block copolymer (SIS), styrene-ethylene/propylene block copolymer (SEP), polyurethane resin, urethane rubber, fluorine-containing rubbers, acrylonitrile-butadiene rubber, ethylene-vinyl acetate copolymer, ethylene-ethyl acrylate copolymer, chlorosulfonated polyethylene and cyclized rubbers. These may be used either alone or in combination.

The glassy resin preferably has a low elongation percentage, a melting or softening point of not lower than 100° C. and a high hardness. Examples of specific glassy resins include saturated or unsaturated alicyclic hydrocarbon resins, styrene-acryl copolymer, ketone resins, vinyl chloride-vinyl acetate copolymer, and polyolefins such as polyethylene and polypropylene. These may be used either alone or in combination.

Where the rubber or rubber-like resin and the glassy resin are used in combination for the vehicle, the mixing ratio thereof varies depending on the elongation percentages of the rubber or rubber-like resin and the glassy resin used. The mixing ratio is preferably adjusted so that the elongation percentage of the vehicle is not lower than $3.5\times10^2$%.

Specifically, combined use of a rubber or rubber-like resin having an elongation percentage of not lower than $4.5\times10^2$% and a glassy resin having an elongation percentage of not higher than 50% provides a vehicle which imparts the masking layer with an excellent flexibility, overwrite characteristic and cut-off characteristic. A typical mixing ratio is 2 to 30 parts by weight, preferably 5 to 15 parts by weight of a glassy resin, with respect to 10 parts by weight of a rubber or rubber-like resin. A vehicle containing the rubber or rubber-like resin and the glassy resin in such a mixing ratio exhibits an appropriate elasticity, and provides a masking layer which is excellent in overwrite characteristic after the transfer thereof. If the proportion of the glassy resin is more than the aforesaid range or the vehicle is composed of the glassy resin alone, the resulting masking layer is poor in flexibility, and liable to crack upon the transfer thereof. If the proportion of the glassy resin is less than the aforesaid range, the resulting masking layer is poor in overwrite characteristic and cut-off characteristic. If the vehicle is composed of the rubber or rubber-like resin alone, the resulting masking layer is poor in cut-off characteristic.

The masking layer is preferably of a porous structure in order to be imparted with an excellent cut-off characteristic. To this end, a filler is generally incorporated into the masking layer. Examples of specific fillers include magnesium carbonate, calcium carbonate, barium carbonate, barium sulfate, aluminum oxide, silicon dioxide, sellaite, clay and talc. The particle diameter of the filler is preferably 1 µm to 20 µm. An excessively small particle size results in a poor cut-off characteristic, while an excessively large particle size results in a poor overwrite characteristic.

The filler is preferably incorporated into the masking layer in a proportion of 5 to 40 parts by weight, more preferably 5 to 18 parts by weight, with respect to 10 parts by weight of the vehicle. If the proportion of the filler is too large, the resulting masking layer suffers from a chalking phenomenon. If the proportion of the filler is too small or no filler is used, the resulting masking layer has a poor cut-off characteristic.

The masking layer is typically colored white because articles to be subjected to masking-correction are generally white paper. Where a paper sheet or a like article colored in a color other than white is to be subjected to masking-correction, the masking layer is preferably colored in substantially the same color as the background color of the article so that masked portions thereof are neither distinguished from the background nor outstanding.

Typically used as a white pigment for the masking layer is titanium oxide powder which is excellent in hiding power. To impart an excellent hiding power to the masking layer, the particle diameter of the white pigment is preferably about 0.1 µm to about 1.0 µm.

A color adjusting agent may be used together with the white pigment to adjust the color of the masking layer. Examples of specific color adjusting agents include aluminum powder, copper powder, brass powder and dyes.

Examples of color pigments other than white pigment include inorganic pigments such as Titanium Yellow, iron oxide pigments, Ultramarine Blue, Cobalt Blue, Chromium Oxide Green, Spinel Green, Chrome Yellow, Chrome Vermilion, Cadmium Yellow and Cadmium Red, and organic pigments such as azo lake pigments, Hanza pigments, benzimidazolone pigments, monoazo pigments, diarylide pigments, pyrazolone pigments, condensed azo pigments, phthalocyanine pigments, quinacridone pigments, perylene pigments, perinone pigments, dioxazine pigments, anthraquinone pigments and isoindolinone pigments.

The amount of the pigment to be used varies depending on its dispersibility in the vehicle, its hiding power and the like, but may be typically 5 to 40 parts by weight, preferably 10 to 20 parts by weight, with respect to 10 parts by weight of the vehicle. If the amount of the pigment is too large, the resulting masking layer suffers from a chalking phenomenon in which pigment powder bleeds out onto the surface of the masking layer. If the amount of the pigment is too small, the hiding power of the resulting masking layer is insufficient.

Where the masking layer is to be colored in a color other than white, the aforesaid color pigments are preferably used in combination with titanium oxide to compensate for their relatively poor hiding power. In such a case, titanium oxide is preferably used in an amount of at least 5 parts by weight, more preferably at least 10 parts by weight, with respect to 10 parts by weight of the vehicle. The amount of color pigment to be used is preferably such that the total amount of the color pigment and titanium oxide is 5 to 40 parts by weight (more preferably 6 to 40 parts by weight), particularly 10 to 20 parts by weight (more preferably 11 to 20 parts by weight), with respect to 10 parts by weight of the vehicle.

For the formation of the masking layer, the pigment and, as required, the filler are added to a solution of the vehicle in an organic solvent, or a dispersion (including emulsion) of the vehicle in an organic solvent or water to prepare a coating liquid. The coating liquid is applied on the foundation tape and then dried.

The dry coating thickness of the masking layer is preferably in a range between 15 µm and 40 µm, more preferably between 18 µm and 34 µm. If the thickness is less than the aforesaid range, the hiding power of the resulting masking layer is insufficient. If the thickness is greater than the aforesaid range, the cut-off characteristic and overwrite characteristic of the resulting masking layer are deteriorated. Further, when a copy of a sheet corrected with such a masking layer is taken, a boundary between a corrected portion and an uncorrected portion of the sheet is copied as a shadow, so that the obtained copy is undesirable.

The thickness of the pressure-sensitive adhesive layer is preferably 0.8 µm to 1.6 µm, more preferably 1.0 µm to 1.4 µm, and the adhesive strength thereof to a polyethylene terephthalate film is preferably 16 to 44 gf/5 mm, more preferably 20 to 40 gf/5 mm.

If the thickness and adhesive strength of the adhesive layer are less than the aforesaid respective preferable ranges, the adhesive strength of the transfer layer is insufficient, resulting in a partial transfer failure. Thus, the transferability of the transfer layer is deteriorated, thereby causing separation or peel-off or cracking of the transfer layer after the transfer thereof. On the other hand, if the thickness and adhesive strength of the pressure-sensitive adhesive layer are greater than the aforesaid respective preferable ranges, the adhesive layer is too tacky. Therefore, the pressure-sensitive correction tape tends to suffer from blocking when stored in a rolled state. This tendency is remarkable particularly when the correction tape is stored at a high temperature and humidity and when the correction tape is wound tight. As a result, when the rolled pressure-sensitive correction tape is used with a hand-operative transfer device, the adhesive layer is peeled off from the foundation tape during the feeding of the correction tape, or a feeding failure occurs. This makes it difficult to use the correction tape.

The adhesive to be used for the pressure-sensitive adhesive layer is not particularly limited as long as the aforesaid requirement for the adhesive strength is satisfied when the thickness of the adhesive layer is adjusted within the aforesaid range. Examples of pressure sensitive adhesives include acrylic resin type adhesives, rosin type adhesives, rubber type adhesives, vinyl ether resin type adhesives and polyisobutylene type adhesives. Among these adhesives, acrylic resin type adhesives and rosin type adhesives are preferred. More specific examples of the acrylic resin type adhesives include NIKASOL TS-910 (Nippon Carbide Industries Co., Inc.), ESDINE #7110 (Sekisui Chemical Co., Ltd.), and ARONTACK HV-5200 and ARONTACK A-1081H (Toagosei Co., Ltd.).

For the formation of the pressure-sensitive adhesive layer, a solution or dispersion of the adhesive in an organic solvent, or an aqueous solution or dispersion (including emulsion) of the vehicle is applied on the masking layer and then dried. It is particularly preferred that the adhesive be used in the form of an aqueous solution or dispersion. This prevents the re-dissolution of the masking layer preliminarily formed. Where the aqueous solution or dispersion is used, a wetting agent or a surface active agent may be added thereto.

The pressure-sensitive correction tape of the present invention can be preferably used with a hand-operative transfer device. Alternatively, the correction tape may be used without the transfer device. For example, the correction tape is overlaid on a portion of a surface to be masked with the pressure-sensitive adhesive layer of the correction tape. A pressure is then be applied to the correction tape by means of a press device such as a spatula to transfer the transfer layer onto the surface for masking-correction.

The present invention will be more fully described by way of examples and comparative examples thereof. It is to be understood that the present invention is not limited to these examples, and various changes and modifications may be made in the invention without departing from the spirit and scope thereof.

EXAMPLES 1 to 5 and COMPARATIVE EXAMPLES 1 to 3

Each masking layer having the composition shown in Table 1 was formed on a foundation.

More specifically, 100 parts by weight of each composition and 163 parts by weight of toluene were mixed by means of an attritor for 20 minutes to prepare a coating liquid. The coating liquid was applied on one side of a 50 μm-thick glassine paper sheet coated with a silicone releasing agent on both sides thereof, and then dried to form a masking layer having a dry coating thickness of 24 μm.

A pressure-sensitive adhesive (NIKASOL TS-910, an aqueous dispersion of an acrylic resin adhesive including 20% by weight of solid component) was applied on a surface of the masking layer, and then dried to form a pressure-sensitive adhesive layer having a dry coating thickness and characteristics as shown in Table 2. Thus, a pressure-sensitive correction tape was obtained. The adhesive strength of the pressure-sensitive adhesive layer to a PET film and the thicknesses of the adhesive layer and the masking layer were determined by the measurement methods previously mentioned.

The pressure-sensitive correction tape was slit into 5 mm-wide tapes and, at the same time, each tape having a length of 10 m was wound around a core. Thus, a pressure-sensitive correction tape in a pancake form was obtained.

Each of the pancake-form pressure-sensitive correction tapes obtained in Examples 1 to 5 and Comparative Examples 1 to 3 was evaluated in the following manner. The results are shown in Table 2.

(1) Anti-blocking characteristic

After the pancake-form pressure-sensitive correction tapes were stored under conditions of 50° C. and 85 RH % for eight days, the correction tapes were each installed in a commercially available hand-operative transfer device (INSTARITE CASSETTE FGT-S1 available from Fujicopian Co., Ltd. ). A 10 m-feeding test was performed for each of the correction tapes to check if a feeding failure occurred due to blocking. Three samples (n=3) for each correction tape were used for the evaluation thereof on the following criteria:

Point 0: Three samples causing feeding failure

Point 1: One or two samples causing feeding failure

Point 2: Three samples causing no feeding failure

Pressure-sensitive correction tapes rated at "Point 2" are acceptable for practical application.

(2) Transferability

A 150 mm-feeding test was performed ten times for each of the pancake-form pressure-sensitive correction tapes immediately after the fabrication thereof to check how many transfer failures occurred on a high-quality paper sheet. The evaluation was based on the following criteria:

Point 0: Three or more transfer failures

Point 1: Two transfer failures

Point 2: Zero or one transfer failure

Pressure-sensitive correction tapes rated at "Point 2" are acceptable for practical application.

(3) Overwrite characteristic

A writing test was performed for each of the pancake-form pressure-sensitive correction tapes immediately after the fabrication thereof. More specifically, the transfer layer of each of the correction tapes was transferred onto a high-quality paper sheet by use of the above-mentioned transfer device and then ten numerals were written on the transferred masking layer by means of a ball-point pen. Thereafter, it was checked how many portions were raised due to a writing pressure. The evaluation was based on the following criteria:

Point 0: Three or more raised portions

Point 1: Two raised portions

Point 2: Zero or one raised portion

Pressure-sensitive correction tapes rated at "Point 2" are acceptable for practical application.

As can be understood from Table 2, the pressure-sensitive correction tapes of Examples 1 to 5 in which the thickness of the pressure-sensitive adhesive layer thereof was within the range between 0.8 μm and 1.6 μm and the thickness ratio between the pressure-sensitive adhesive layer and the masking layer was within the range between 1:14 and 1:35 exhibited an excellent anti-blocking characteristic without any deterioration in the transferability and overwrite characteristic. On the contrary, the pressure-sensitive correction tapes of Comparative Examples 1 to 3 in which the thickness of the pressure-sensitive adhesive layer thereof was out of the aforesaid range did not satisfy the requirements for the anti-blocking characteristic, transferability and overwrite characteristic.

TABLE 1

| Component | Parts by weight |
|---|---|
| Titanium oxide (particle diameter: 0.1 μm to 1 μm) | 50.0 |
| Magnesium carbonate (particle diameter: 1 μm to 10 μm) | 19.0 |
| Styrene-ethylene-butylene-styrene copolymer (elongation percentage: 750%) | 14.0 |
| Alicyclic saturated hydrocarbon resin (elongation percentage 0%) | 14.0 |
| Dispersant (HOMOGENOL L-18) | 3.0 |

Elongation percentage of vehicle: 370%

TABLE 2

| | Thickness of pressure-sensitive adhesive layer (μm) | Thickness of masking layer (μm) | Thickness of pressure-sensitive adhesive layer/thickness of masking layer | Adhesive strength of pressure-sensitive adhesive layer (gf/5 mm) | Evaluation | | |
|---|---|---|---|---|---|---|---|
| | | | | | Anti-blocking | Transferability | Overwrite characteristic |
| Ex. 1 | 0.8 | 24 | 1:30 | 18 | 2 | 2 | 2 |
| Ex. 2 | 1.0 | 24 | 1:23 | 21 | 2 | 2 | 2 |
| Ex. 3 | 1.1 | 24 | 1:21 | 24.5 | 2 | 2 | 2 |
| Ex. 4 | 1.4 | 24 | 1:17 | 28 | 2 | 2 | 2 |
| Ex. 5 | 1.6 | 24 | 1:15 | 40 | 2 | 2 | 2 |
| Com. Ex. 1 | 0.7 | 24 | 1:34 | 12 | 2 | 0 | 2 |
| Com. Ex. 2 | 1.7 | 24 | 1:14 | 45 | 1 | 2 | 2 |
| Com. Ex. 3 | 2.9 | 24 | 1:8 | 80 | 0 | 2 | 1 |

In addition to the materials and ingredients used in the Examples, other materials and ingredients can be used as set forth in the specification to obtain substantially the same results.

As described above, the pressure-sensitive correction tape of the present invention in which the thickness of the pressure-sensitive adhesive layer thereof is within the range between 0.8 μm and 1.6 μm and the thickness ratio between the pressure-sensitive adhesive layer and the masking layer is within the range between 1:14 and 1:35 exhibits an improved anti-blocking characteristic without any deterioration in the transferability and overwrite characteristic.

What is claimed is:

1. A pressure-sensitive correction tape comprising:

a foundation tape; and a pressure-sensitive transfer layer for masking-correction formed on one side of the foundation tape;

the pressure-sensitive transfer layer comprising a masking layer containing a pigment and a vehicle, and a pressure-sensitive adhesive layer formed on a surface of the masking layer;

wherein the pressure-sensitive adhesive layer has a thickness of 0.8 μm to 1.6 μm; and wherein a thickness ratio between the pressure-sensitive adhesive layer and the masking layer is 1:14 to 1:35.

2. The pressure-sensitive correction tape of claim 1, wherein the pressure-sensitive adhesive layer has an adhesive strength of 16 to 44 gf/5 mm to a polyethylene terephthalate film.

3. The pressure-sensitive correction tape of claim 1, wherein the thickness ratio between the pressure-sensitive adhesive layer and the masking layer is 1:16 to 1:24.

* * * * *

UNITED STATES PATENT AND TRADEMARK OFFICE
CERTIFICATE OF CORRECTION

PATENT NO. : 5,700,552
DATED : December 23, 1997
INVENTOR(S) : Katsuro, et al

It is certified that error appears in the above-identified patent and that said Letters Patent is hereby corrected as shown below:

<u>Title page,</u>
Item [56], insert U.S. Patent Documents -- 4,891,260 1/1990 Kunkel 428/220 5,221,577 6/1993 Inaba 428/354 --.

<u>Column 1,</u>
Line 19, delete "pressre-sensitive" and substitute therefor -- pressure-sensitive --.

<u>Column 2,</u>
Line 45, delete "cause of the" and substitute therefor -- the cause of --.

Signed and Sealed this

Thirtieth Day of October, 2001

*Attest:*

Nicholas P. Godici

NICHOLAS P. GODICI

*Attesting Officer* *Acting Director of the United States Patent and Trademark Office*